July 28, 1931.  A. W. DALLAS  1,816,362
CLOSET BOWL
Filed Feb. 25, 1930
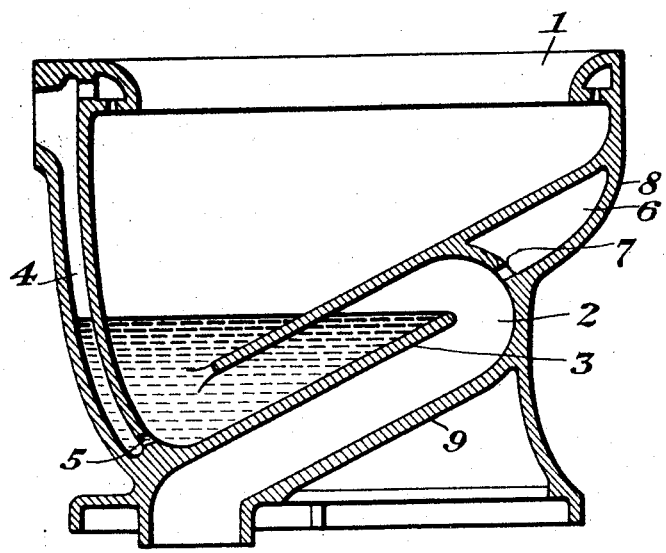
Inventor,
Alva W. Dallas,
by James Ackerman.
Attorney.

Patented July 28, 1931

1,816,362

UNITED STATES PATENT OFFICE

ALVA W. DALLAS, OF TRENTON, NEW JERSEY

CLOSET BOWL

Application filed February 25, 1930. Serial No. 431,171.

This invention relates to closet bowls and particularly to means incorporated in the bowl for facilitating the flushing of the bowl and silencing the noise, due to the rush of water during the flushing operation.

It is a further object of this invention to provide a cushioning chamber in such association or relation to the trap of a bowl of this character that the siphon will function more completely and quickly, as well as more quietly.

The invention furthermore has for an object the production of a bowl of this character having the function and advantages noted, while, at the same time, the external appearance of the bowl is enhanced.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, in which the bowl is illustrated in vertical section.

In the drawing, 1 denotes a flushing rim of any preferred construction, and the said bowl has the usual trap 2 which includes a wall 3.

Provision is made for delivering a jet of water through the rear wall of the bowl and the said jet accelerates the discharge of water from the trap. A duct 4 supplies water through the opening 5 in the bowl to produce the jet and this, with the water discharged from the rim, flows through the trap and discharges at the bottom of the bowl in the usual way.
The front wall of the bowl is provided with a cushioning chamber 6 whose inner wall is provided with an aperture 7, through which air is forced as water rises in the trap, and the air then acts as a cushion that lessens the noise of the rushing water, and the force of the air thus compressed results in forcing the water to the discharge opening of the trap.
The chamber is self-draining, owing to the location of the aperture 7 at the lowermost part of the chamber.

The front wall 8 of the bowl extends in a graceful outline from the top to the bottom and the lower wall 9 of the trap is approximately parallel with the intermediate wall 3, and the pitch of these walls is such that the scavenging action of the bowl and trap is facilitated.

As the function of the several parts of the bowl and the structural features thereof have been given in connection with a description of the said bowl, further detail or resumé of the construction, operation and advantages is believed unnecessary for an understanding of the invention by one skilled in the art.

I claim:

A closet bowl having a trap with its siphon discharge at the front thereof, the said bowl having a cushioning chamber with a communicating aperture in the path of travel of water passing from the bowl to the trap and in spaced relation to that part of the bowl containing water when flushing is inactive, whereby when flushing occurs the water overflowing the normal water holding capacity of the bowl forcefully contacts the wall of the chamber and exerts force on air in the chamber and its aperture.

ALVA W. DALLAS.